(12) United States Patent
Denham et al.

(10) Patent No.: US 7,438,773 B2
(45) Date of Patent: Oct. 21, 2008

(54) METHOD OF MANUFACTURING A BLIND THREADED INSERT

(75) Inventors: Keith Denham, Herts (GB); Matthias Jokisch, Langenhagen (DE)

(73) Assignee: Avdel UK Limited (GB)

( * ) Notice: Subject to any disclaimer, the term of this patent is extended or adjusted under 35 U.S.C. 154(b) by 171 days.

(21) Appl. No.: 10/415,178

(22) PCT Filed: Oct. 11, 2001

(86) PCT No.: PCT/GB01/04526

§ 371 (c)(1),
(2), (4) Date: Jul. 29, 2003

(87) PCT Pub. No.: WO02/38329

PCT Pub. Date: May 16, 2002

(65) Prior Publication Data
US 2004/0035506 A1      Feb. 26, 2004

(30) Foreign Application Priority Data
Nov. 9, 2000   (GB)   .................................. 0027388.8

(51) Int. Cl.
*C21D 9/22*   (2006.01)

(52) U.S. Cl. ........................................ 148/587; 148/573
(58) Field of Classification Search ................. 148/587, 148/573
See application file for complete search history.

(56) References Cited

U.S. PATENT DOCUMENTS

| | | | | |
|---|---|---|---|---|
| 3,253,495 A | * | 5/1966 | Orloff | 411/34 |
| 3,532,560 A | * | 10/1970 | Mitsuo et al. | 148/599 |
| 5,141,373 A | * | 8/1992 | Kendall | 411/43 |
| 5,603,592 A | * | 2/1997 | Sadri et al. | 411/34 |
| 5,810,530 A | * | 9/1998 | Travis | 411/34 |
| 6,761,520 B1 | * | 7/2004 | Dise | 411/38 |

FOREIGN PATENT DOCUMENTS

JP   5033108   2/1993

* cited by examiner

*Primary Examiner*—Scott Kastler
(74) *Attorney, Agent, or Firm*—Trexler, Bushnell, Giangiorgi, Blackstone & Marr, Ltd.

(57) ABSTRACT

A method of manufacturing a blind threaded insert from metal which method comprises the steps of at least partially forming the insert, by a cold-forming process, other than the internal thread; forming the internal thread; and annealing the appropriate part of the insert to promote later deformation during installation.

16 Claims, 8 Drawing Sheets

METHOD OF MANUFACTURING A BLIND THREADED INSERT

RELATED/PRIORITY APPLICATIONS

This application claims priority with respect to International Application No. PCT/GB01/04526, filed Oct. 11, 2001, and British Application No. 0027388.8, filed Nov. 9, 2000.

The invention relates to a method of manufacturing a blind threaded insert from metal, which insert can be inserted through a workpiece and then radially expanded to secure it to the workpiece. In this context, "blind" means that the insert can be installed by access to one side only of the workpiece. Such blind inserts are well known in manufacturing industry, and are available, for example, under the names Avdel Large Flange Hexsert and Avdel Thin Sheet Nutsert (the words AVDEL, HEXSERT, NUTSERT and THIN SHEET NUTSERT are Registered Trade Marks).

Blind threaded inserts are usually manufactured either by machining from bar, or using cold forming techniques and bulk annealing processes, the latter method providing the most economic manufacturing route. The strength of such fasteners when installed by the end user in the application is adequate for light or medium duty. Consequently, for heavy duty applications blind threaded inserts are not used.

The present invention aims to provide a new manufacturing method for producing blind threaded inserts which have a strength compatible with heavy duty applications.

In the conventional manufacturing route, there is some increase in hardness and tensile strength in the threaded portion resulting from the one cold working operation which is carried out after the bulk annealing process, but of course any benefit in respect of increased strength of the cold working processes prior to annealing is lost.

The present invention provides, in one of its aspects, a method of manufacturing.

The present invention provides, in another of its aspects, a method of manufacturing According to this method, the bulk annealing process is used prior or subsequent to producing the internal threads and then the thread portion is induction hardened. In this case the material from which the inserts are manufactured is one which has sufficient carbon or other alloying elements to respond to the induction hardening process.

Further features of the invention are set out in the other appended claims. The invention includes an insert manufacture by a method according to the invention.

Some specific examples of the invention will now be described by way of example and with reference to the accompanying drawings, in which:

In FIGS. 1, 3, 4, 5a, 8, 9,10 and 11 the insert is shown in longitudinal axial section, and in FIG. 5b in cross-section, the cross-section being taken on the arrowed section line on the longitudinal section on FIG. 5a.

FIGS. 2a, 4a and 4b illustrate the prior art.

Figure 2A:
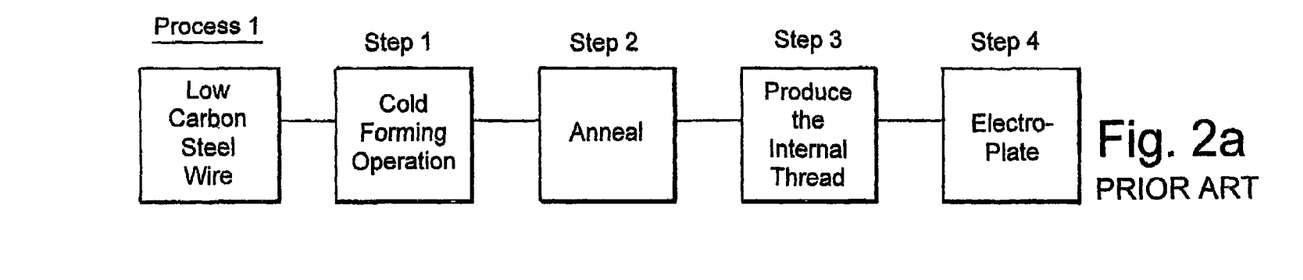
FIGS. 2a, 2b, and 2c show the manufacturing process routes for the manufacture of blind threaded inserts.
Figure 2B:
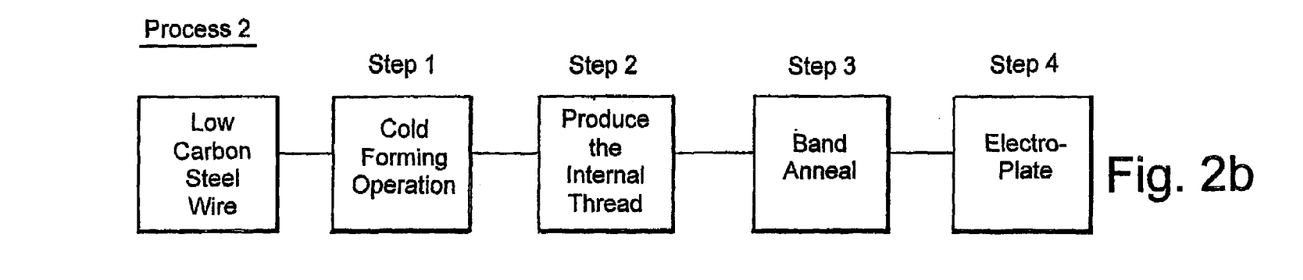
Figure 2C:
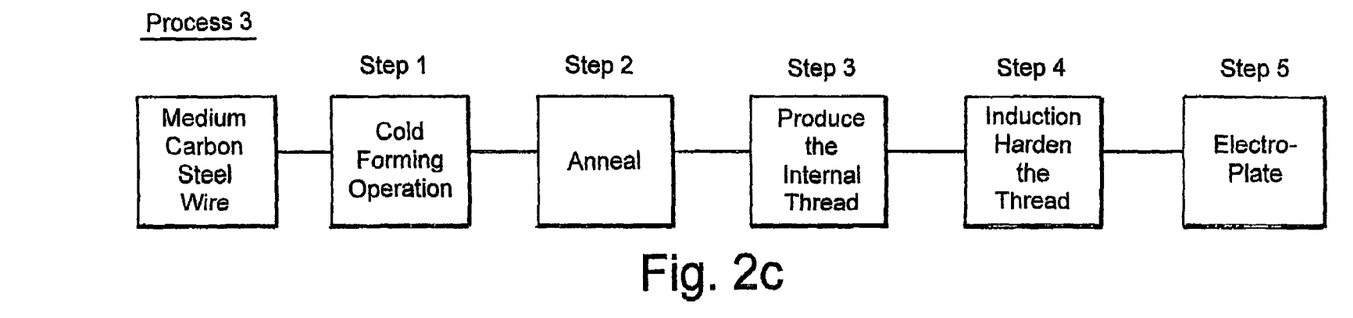

The manufacturing methods in Step 1 of FIGS. 2a, 2b, and 2c, are performed using a progressive cold-heading machine. The manufacturing method for producing the internal thread as in Step 3 of FIGS. 2a and 2c, and Step 2 of FIG. 2b is commonly referred to as roll-tapping. These manufacturing methods are of the type commonly used to make blind threaded inserts and are well known and understood by those skilled in the art.

Figure 1A:
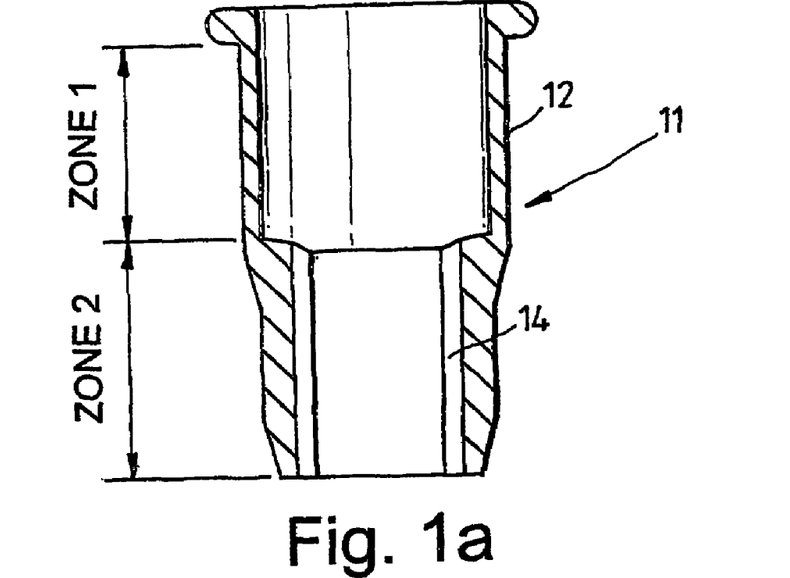
FIGS. 1a and 1b show a blind threaded insert before and after installation in a workpiece.
Figure 1B:
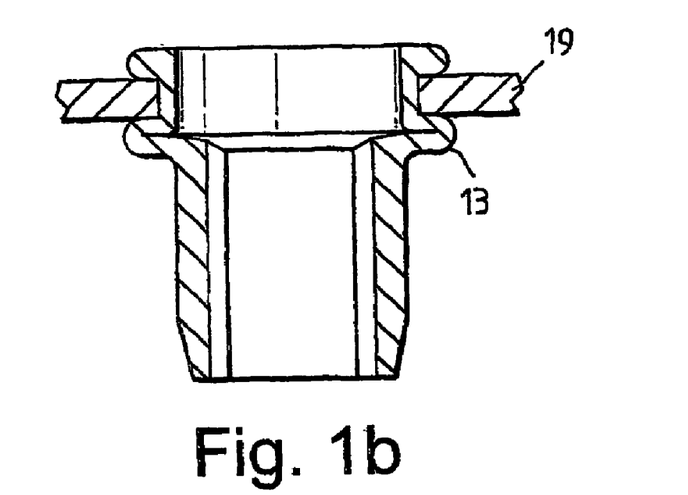

Thus, referring first to FIG. 1a the blind threaded insert 11 could be produced by any of the processes shown in FIGS. 2a, 2b, or 2c. The example shown is cylindrical and is intended to fit in a suitably sized circular hole in the workpiece 19 (FIG. 1b). In other examples not shown, the outer surface 12 of the insert may be polygonal in cross-section, for example hexagonal or square to fit in a correspondingly shaped hole in the application.

Figures 3A, 3B, 4A, 4B:
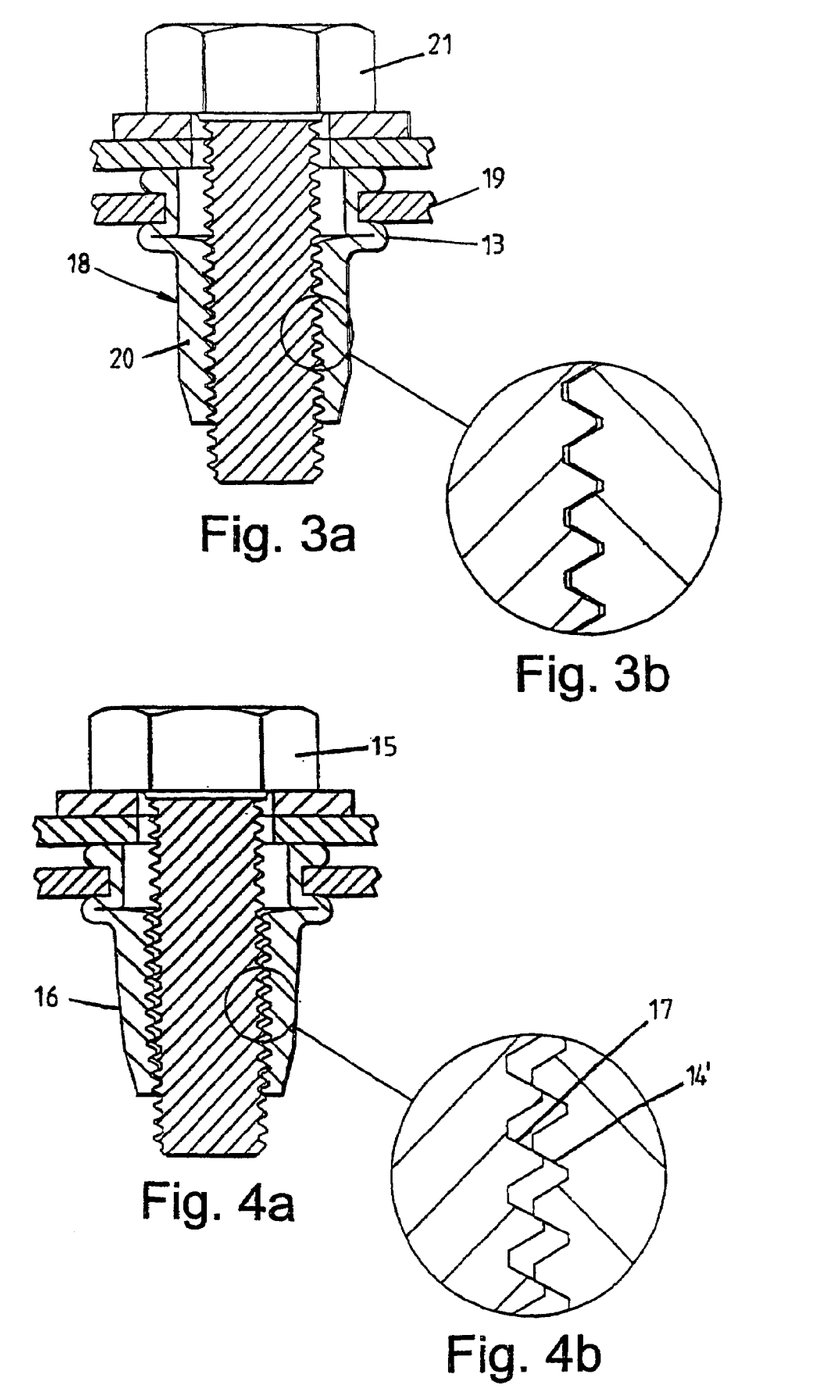
FIGS. 3a and 3b, 4a and 4b show the configuration of installed blind threaded inserts when a tightening torque is applied to the mating bolt.
Figure 5A:
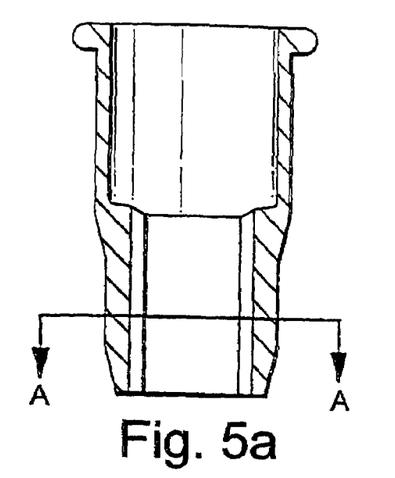
FIG. 6 shows the hardness and corresponding tensile strength of the material in the nut portion of the insert and FIGS. 5a and 5b show the position on the insert at which these hardness values relate.
Figure 5B:
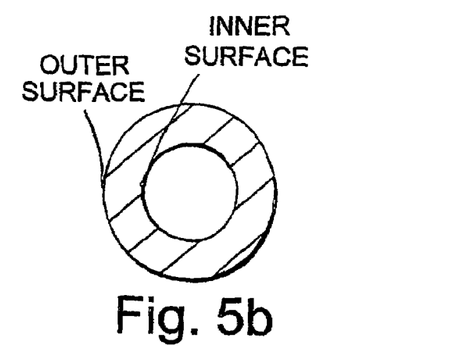
Figure 6:
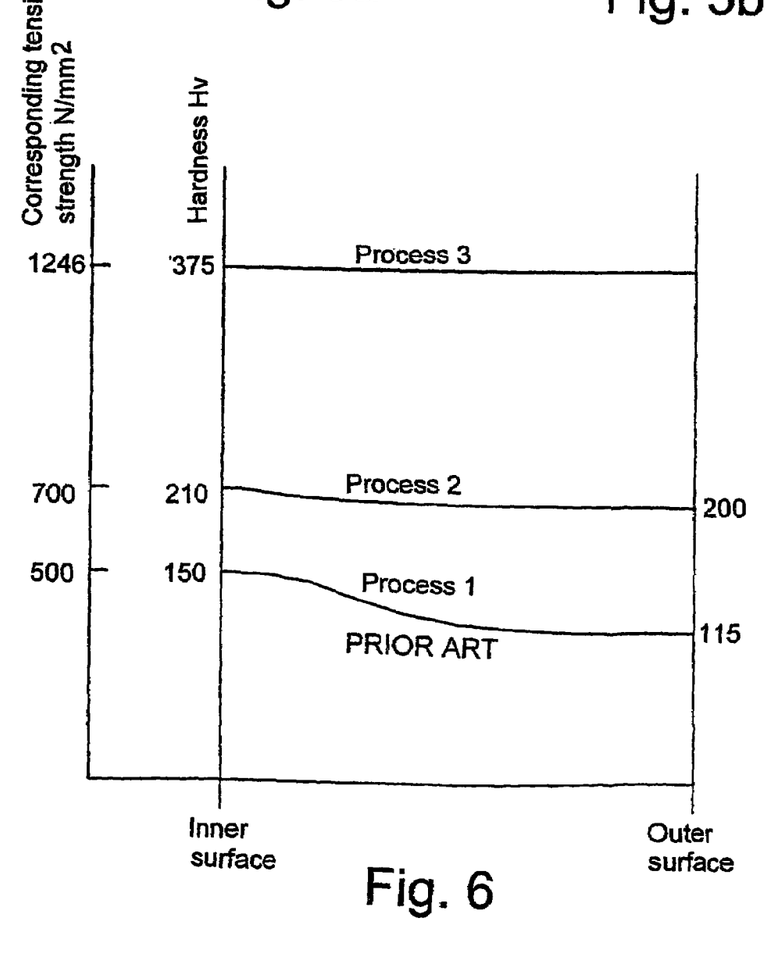

Zone 1 of the insert shown in FIG. 1a is required to be sufficiently ductile to plastically deform by the action of the installation tool (not shown) to form the blind-side bulb 13 in FIG. 1b. In prior art examples of insert manufacturing process, this ductility is achieved by carrying out an annealing process on the whole of the insert, usually as a bulk process applied to the whole batch as shown in Step 2 FIG. 2a. In the prior art insert manufacturing method shown as Process 1 FIG. 2a, the internal thread 14 FIG. 1a is produced at Step 3 FIG. 2a. By producing it this way after the annealing process, there is some local work hardening in the thread region. The hardness of the insert blank after the bulk annealing process is typically 115 Hv (Vickers Hardness Number), the insert material being typically low carbon steel having 0.1% Carbon. This hardening of the thread is localised to the material near the thread surface. A short distance from the thread surface, the hardness rapidly reduces, as shown on the 'Process 1' line in FIG. 6. If an attempt were made to use such an insert in heavy duty applications where the mating bolt requires a high level of tightening torque, then because the strength of the material at this section (as shown in FIGS. 5b and 6) is relatively low, the radial force created by the tightening of the bolt 15 in FIG. 4a against the thread in the insert can be sufficient to cause the nut portion to expand radially as shown 16 in FIGS. 4a and 4b. This causes a reduction in contact area between the thread on the bolt 17 in FIG. 4b and the internal thread in the insert $14^1$. The reduction in contact area together with the lower thread hardness of the insert results in thread failure at a relatively low tightening torque. For example, an insert with an M8 thread will fail at a tightening torque of about 40 to 45 Nm.

With an insert manufactured by a process of the present example (Process 2 FIG. 2b), the work hardening of the material which is created during the wire manufacturing process and when the wire is converted into an insert by the cold forming operation Step 1 and the roll tapping operation Step 2 in FIG. 2b is accumulative, resulting in a high level of hardness as shown in FIG. 6 for Process 2. Thus an insert 18-(FIG. 3a) manufactured by this process can be satisfactorily installed in the workpiece 19 because the band annealing Step 3 (FIG. 2b) provides sufficient ductility to allow the blind bulb 13 to form without cracking and the internally threaded portion 20 of the insert has sufficient strength to resist expansion when the bolt 21 (FIG. 3*a*) is tightened even to very high tightening torques.

For example an M8 insert manufactured by a process of the present invention can be tightened to torques in excess of 70 Nm without failure. Such an insert is compatible in respect of tightening torques to grade 10.9 and 12.9 bolts.

Figure 10:
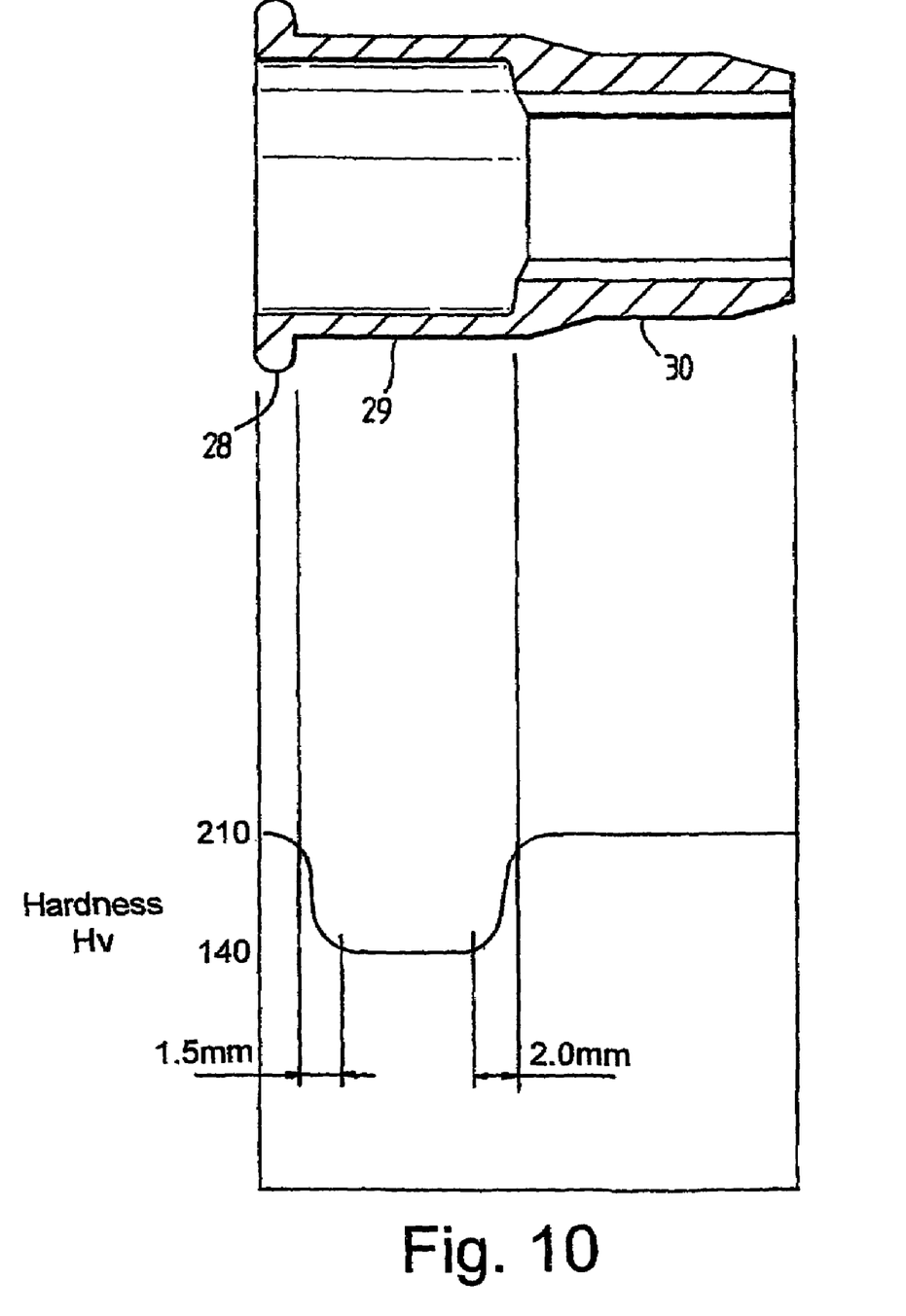
FIGS. 10 and 11 show the hardness along the longitudinal sections.

The hardness profile created by the band annealing operation can be varied according to the selected process parameters such as the geometry of the band annealing coil, the machine power settings and the process time. Due to the severity of plastic deformation when the blind bulb is formed it is desirable to have a smooth transition from the annealed zone to the hard zone. Such a profile is shown in FIG. 10, where an M8 insert has a hardness transition between insert flange 28 and the deforming cylindrical section 29 over a distance of approximately 1.5 mm, and a hardness transition between the threaded portion 30 and section 29 over a distance of approximately 2.0 mm.

In a further embodiment of the invention, an insert which has the requisite ductility in Zone 1 (FIG. 1*a*) and a high strength in Zone 2 for compatibility with grade 10.9 and 12.9 bolts can be produced using manufacturing Process 3 in FIG. 2*c*. In this case the insert is manufactured from a medium carbon steel having typically 0.3 to 0.35% carbon. The bulk annealing process Step 2 (FIG. 2*c*) produces a hardness of typically 140 Hv. At this hardness, the insert has sufficient ductility to sustain the blind side bulbing during installation without fracturing. Step 4 of Process 3 (FIG. 2*c*) involves the induction hardening of Zone 2 FIG. 1*a*. This process produces a generally even hardness in Zone 2 of about 350 to 400 Hv as shown in the Process 3 line in FIG. 6.

Figure 11:
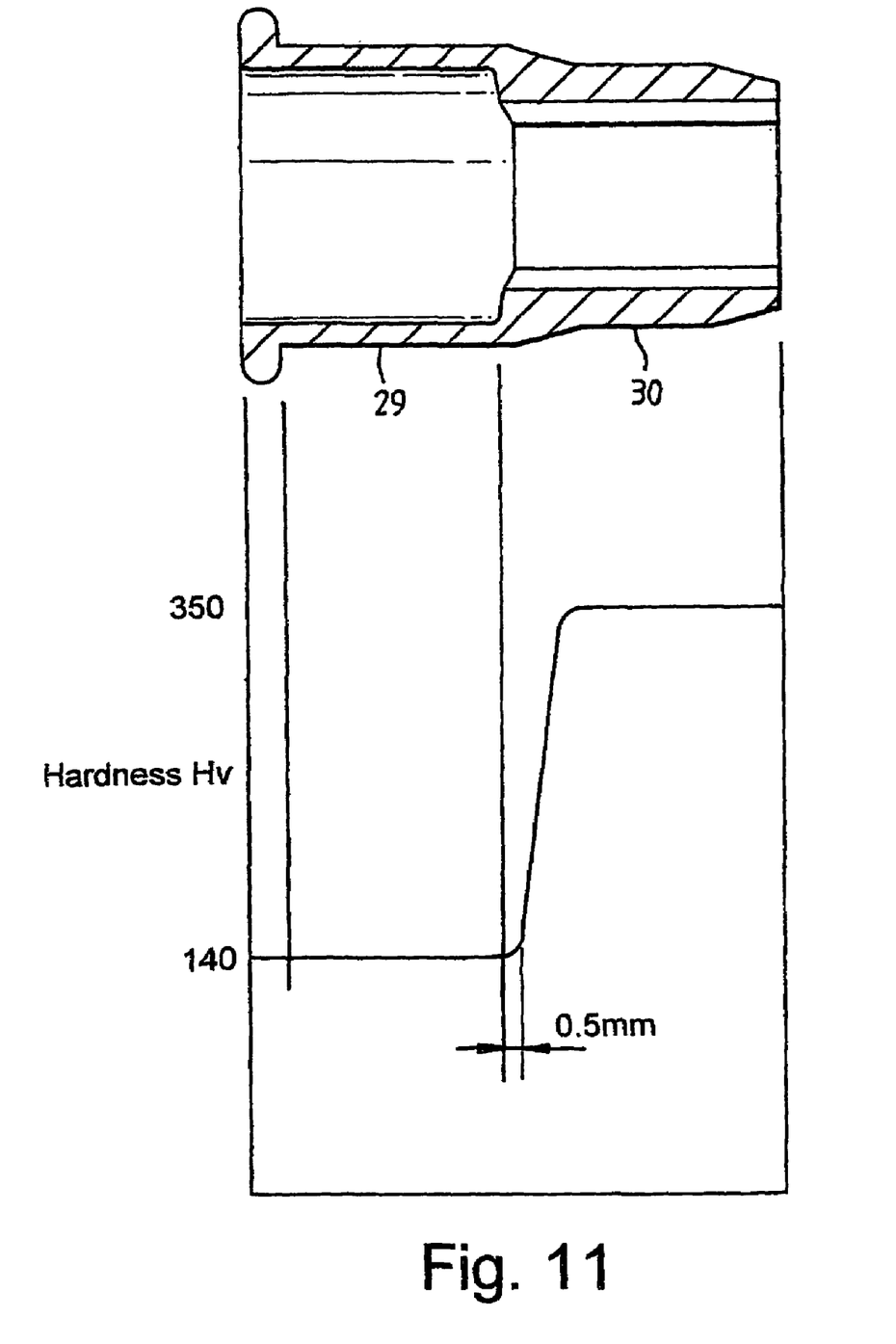

The induction hardening process is controlled such that the hardening does not extend into Zone 1, otherwise when the blind bulb is formed it would be prone to fracture at the annealed-hardened junction. For this reason, the induction hardened region does not extend fully the length of Zone 2. For an M8 insert, for example, the unhardened portion of Zone 2 would be approximately 0.5 mm as shown in FIG. 11.

It would be possible to modify the method of the example by interchanging Steps 3 and 4 of FIG. 2*c*, so that the internal thread is formed after the induction hardening step.

An advantage of inserts of the present invention manufactured by Process 2 (FIG. 2*b*) or Process 3 (FIG. 2*c*) is that they are particularly suitable for use in workpieces known as hydroformed sections. In such workpieces, shown in FIG. 7, the hole into which the insert is to be installed is punched during the hydroforming process. Because this is a blind operation there is not a die as in conventional hole piercing. This results in a dimpling effect in which the material at the edge of the hole is lower than the top surface of the workpiece. Another feature of punching holes in hydroformed sections is that the pierce slug 23 in FIG. 7 purposely is left attached to the parent workpiece.

The advantage of using an insert of the present invention will become apparent from the following.

Figure 7:
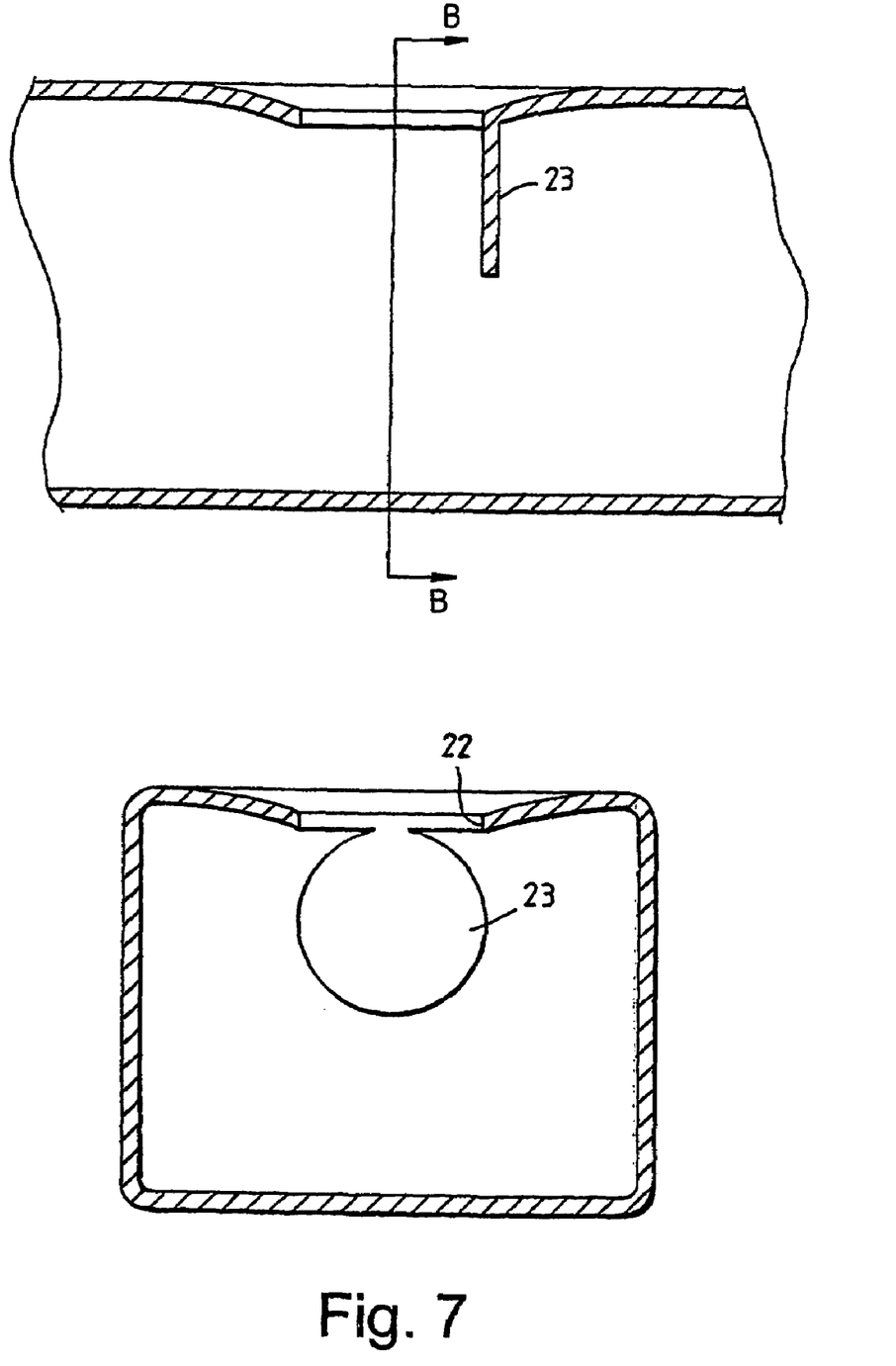
FIG. 7 shows a particular type of workpiece in which inserts of the present invention may be used to advantage.
Figure 8:
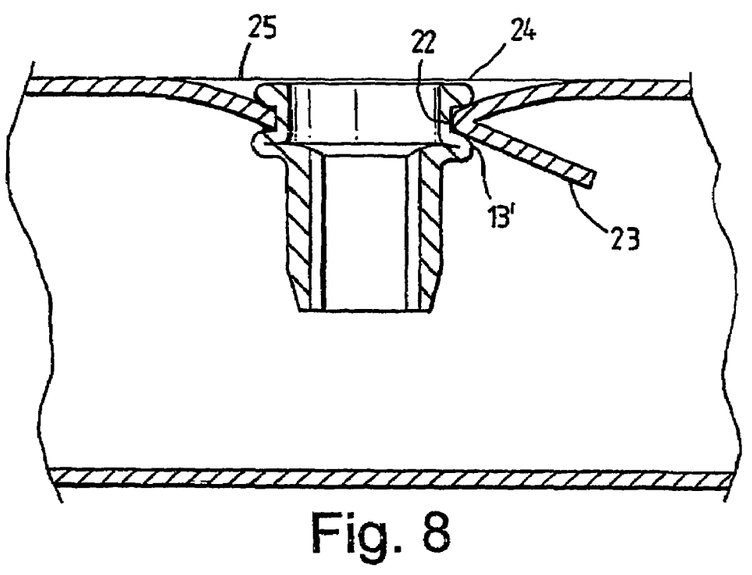
FIG. 8 shows an insert installed in such a workpiece.

Referring to FIG. 8, which is a longitudinal section through a blind insert installed in a hydroformed section such as shown in FIG. 7, it can be seen that the blind bulb 13[1] at the position on the circumference of hole 22 where it meets the retained slug 23 is partially obstructed by the slug, to the extent that the blind bulb 13 is unable to form evenly. However, because the insert is ductile in this region it is able to plastically deform around this obstruction. Furthermore, in some instances, the dimpling effect on the hole is such that the top surface 24 of the installed insert is below the surface 25 of the hydroformed workpiece.

Figure 9:
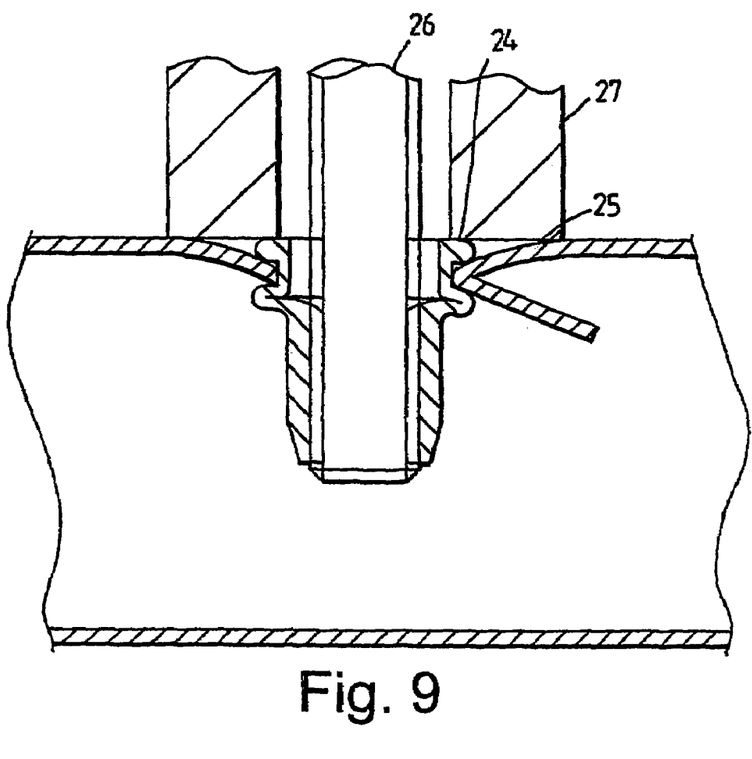
FIG. 9 shows a post-installation process being applied to the workpiece.

In such cases, a tool can be used as shown in FIG. 9 consisting of a drawbolt 26 and a flat anvil 27 in which sufficient pulling force is applied to the insert to cause the dimple in the workpiece to reduce until the top of the insert 24 (FIG. 9) is at the same level as the top face of the workpiece 25. Of course, if the top face of the insert 24 was required to be above the level of workpiece 25 then an anvil which had an annular recess in its front face could be used. It is also feasible to combine the action of the drawbolt and anvil with that of the insert installation tool. The operation of using a drawbolt and anvil to flatten the dimple requires a relatively high force, which force has to be transmitted through the thread of the insert, through the blind side bulb, onto the workpiece. An insert which has high strength of thread combined with high ductility in the blind side bulbing region is ideal for such applications. The insert of the present example meets this requirement.

The invention is not restricted to the details of the foregoing examples.

The invention claimed is:

1. A method of manufacturing a blind threaded insert from metal comprising a first zone and a second zone, the second zone including a nut portion, and the first zone including a radially enlarged head at one end remote from the second zone, a single deformable section, a first transition section between the deformable section and the head, and a second transition section between the deformable section and the second zone, the deformable section having a higher relative ductility than the remainder of the insert; and extending over a greater length of the first zone than the length over which each of the transition sections extend;

which method comprises the steps of:
   (a) at least partially forming the insert, by a cold-forming process, other than an internal thread;
   (b) forming the internal thread in the nut portion; and
   (c) annealing the first zone of the insert to produce a ductility in the deformable section which is higher than the ductility of the remainder of the insert and so that the deformable section has a hardness value which is lower than the hardness of the nut portion and which is of a substantially constant value along its length in order to promote later deformation in the deformable section during installation of the insert.

2. A process as in claim 1, in which the annealing step is carried out by band annealing the first zone.

3. A method as claimed in claim 1, in which the metal is low carbon steel.

4. A method as claimed in claim 2, which is modified by the interchange in position of the steps of forming the internal thread and of band-annealing the first zone.

5. A method of manufacturing a blind threaded insert from metal comprising a first zone and a second zone, the second zone including a nut portion, and the first zone including a radially enlarged head at one end remote from the second zone, and a single deformable section, a first transition section between the deformable section and the head, and a second transition section between the deformable section and the second zone, the deformable section having a higher relative ductility than the remainder of the insert, such that, during installation of the insert, the deformable section will deform in preference to the remainder of the insert, wherein the deformable section extends over a greater length of the first zone than the length over which each of the transition sections extend;

which method comprises the steps of:
   (a) at least partially forming the fastener, by a cold-forming process, other than an internal thread;

(b) annealing the first zone of the insert to produce a ductility in the deformable section which is higher than the ductility of the remainder of the insert, such that the hardness of the deformable section is so that the deformable section has a hardness value which is lower than the hardness of the nut portion and which is of a substantially constant value along a its length;

(c) forming the internal thread in the nut portion; and (d) induction hardening at least part of the nut portion.

6. A method as claimed in claim 5, which is modified by the interchange of the positions of the steps of forming the internal thread and of annealing the first zone.

7. A method as claimed in claim 5 in which the metal is medium carbon steel.

8. A method as claimed in claim 1, which includes a subsequent surface-treatment step.

9. A method as claimed in claim 8, in which the surface-treatment step comprises electroplating.

10. A blind threaded insert comprising a first zone and a second zone, the second zone including a nut portion, and the first zone including a radially enlarged head at one end remote from the second zone, a single deformable section, a first transition section between the deformable section and the head, and a second transition section between the deformable section and the second zone, the deformable section having a higher relative ductility than the remainder of the insert, such that the deformable section will deform in preference to the remainder of the insert, wherein the deformable section extends over a greater length of the length over which each of the transition sections extend; the insert manufactured by:

(a) at least partially forming the insert, by a cold-forming process, other than an internal thread;

(b) forming the internal thread in the nut portion; and (c) annealing the first zone, the insert having a hardness value in the deformable section which is lower than the hardness of the nut portion and which is of a substantially constant value along its length in order to promote deformation in the deformable section during installation of the insert.

11. A blind threaded metal insert comprising a first zone and a second zone, the second zone including an internally threaded nut portion, and the first zone including a radially enlarged head at one end remote from the second zone, a single deformable section having a higher relative ductility than the remainder of the insert, the nut portion having an internal thread and a hardness of substantially constant value extending radially from the internal thread to the outer surface of the nut portion, the deformable section having a hardness of a substantially constant value which is lower than the hardness of the nut portion, such that deformation will occur in the deformable section in preference to the remainder of the insert.

12. An insert according to claim 11 wherein the hardness of the nut portion is in excess of Hv200.

13. A blind threaded insert comprising a first zone and a second zone, the second zone including an internally threaded nut portion, and the first zone including a radially enlarged head at one end remote from the second zone, and a single deformable section, a first transition section between the deformable section and the head, and a second transition section between the deformable section and the second zone, the deformable section having a hardness value which is lower than the hardness of the nut portion and which is of a substantially constant low value along its length in order to promote deformation of the deformable section during installation, and wherein the deformable section extends over a greater length of the length over which each of the transition sections extend.

14. A method of manufacturing a blind threaded insert from metal comprising a first zone and a second zone, the second zone including a nut portion, and the first zone including a radially enlarged head at one end remote from the second zone, and a single deformable section, a first transition section between the deformable section and the head, and a second transition section between the deformable section and the second zone, the deformable section having a higher relative ductility than the remainder of the insert and extending over a greater length than the length over which each of the transition sections extend; which method comprises the steps of:

(a) partially forming the insert, by a cold-forming process, other than an internal thread;

(b) annealing the first zone of the insert so that the deformable section has a hardness value which is lower than the hardness of the nut portion and which is of a substantially constant low value along its length in order to promote later deformation of the deformable section during installation of the insert; and (c) forming the internal thread.

15. A method according to claim 14, further comprising the step of completing the forming process of step (a) before forming the internal thread.

16. A method of manufacturing a blind threaded insert from metal comprising a first zone and a second zone, the second zone including a nut portion, and the first zone including a radially enlarged head at one end remote from the second zone, and a single deformable section, a first transition section between the deformable section and the head, and a second transition section between the deformable section and the second zone, the deformable section having a higher ductility relative to the remainder of the insert and extending over a greater length than the length over which each of the transition sections extend; which method comprises the steps of:

(a) partially forming the fastener, by a cold-forming process, other than an internal thread;

(b) annealing the insert;

(c) completing the forming process of step (a); and (d) forming the internal thread in the nut portion.

\* \* \* \* \*